United States Patent
Shveidel et al.

(10) Patent No.: US 12,493,560 B2
(45) Date of Patent: Dec. 9, 2025

(54) FLEXIBLY SIZED VIRTUAL LAYER BLOCKS FOR LOGICAL ADDRESS MAPPING

(71) Applicant: Dell Products L.P., Round Rock, TX (US)

(72) Inventors: Vladimir Shveidel, Pardes Hana-Karkur (IL); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/638,959

(22) Filed: Apr. 18, 2024

(65) Prior Publication Data

US 2025/0328472 A1    Oct. 23, 2025

(51) Int. Cl.
   *G06F 12/08*      (2016.01)
   *G06F 12/0891*    (2016.01)
   *G06F 12/10*      (2016.01)
   *G06F 12/1009*    (2016.01)

(52) U.S. Cl.
   CPC ...... *G06F 12/0891* (2013.01); *G06F 12/1009* (2013.01)

(58) Field of Classification Search
   CPC .......................... G06F 12/0891; G06F 12/1009
   See application file for complete search history.

(56) References Cited

U.S. PATENT DOCUMENTS

| | | | |
|---|---|---|---|
| 2014/0156968 A1* | 6/2014 | Terry | G06F 12/1009 711/207 |
| 2014/0169457 A1 | 6/2014 | Dzik et al. | |
| 2017/0347096 A1 | 11/2017 | Hong et al. | |
| 2019/0324916 A1* | 10/2019 | Armangau | G06F 12/0868 |
| 2020/0128307 A1 | 4/2020 | Li | |
| 2020/0349032 A1* | 11/2020 | Nanda | G06F 12/1009 |
| 2024/0104015 A1* | 3/2024 | Punniyamurthy | G06F 12/1009 |

FOREIGN PATENT DOCUMENTS

CN           104025010 A  *  9/2014  ......... G06F 12/0246

* cited by examiner

*Primary Examiner* — Masud K Khan
(74) *Attorney, Agent, or Firm* — BainwoodHuang

(57) ABSTRACT

A working set of data blocks to be flushed from a cache to non-volatile data storage is identified, and a physical block of non-volatile data storage is allocated. At least some of the data blocks in the working set are compressed to generate compressed data blocks. The compressed data blocks are stored into the physical block of non-volatile data storage. For each one of the compressed data blocks stored into the physical block, an independent virtual layer pointer indicating a location of that compressed data block within the physical block of non-volatile data storage is stored into a single, flexibly sized virtual layer block that is allocated for storing the working set. The flexibly sized virtual layer block is part of a logical address mapping tree.

18 Claims, 7 Drawing Sheets

FLEXIBLY SIZED VIRTUAL LAYER BLOCKS FOR LOGICAL ADDRESS MAPPING

TECHNICAL FIELD

The present disclosure relates generally to technology for mapping logical addresses to non-volatile data storage in a data storage system, and more specifically to technology for using flexibly sized virtual layer blocks in a logical address mapping tree.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

When processing a host I/O request, a data storage system may access a logical volume of non-volatile data storage hosted within the data storage system. The logical volume may, for example, be used to store host data indicated by write requests, and provide access to previously stored host data through read requests. The data storage system determines the location of the specific physical non-volatile storage that stores host data indicated by a host request, e.g. within a logical volume of non-volatile data storage served by the data storage system, by traversing a data structure referred to as the "logical address mapping tree" for the logical volume.

SUMMARY

In the disclosed technology, a working set of data blocks to be flushed from a cache to non-volatile data storage is identified, and a physical block of non-volatile data storage is allocated. At least some of the data blocks in the working set are compressed to generate compressed data blocks. The compressed data blocks are stored into the physical block of non-volatile data storage. For each one of the compressed data blocks that are stored into the physical block, an independent virtual layer pointer indicating a location of that compressed data block within the physical block of non-volatile data storage is stored into a single, flexibly sized virtual layer block that is allocated for the working set, where the flexibly sized virtual layer block is part of a logical address mapping tree.

In some embodiments, a total size of the flexibly sized virtual layer block is dynamically calculated. The total size of the flexibly sized virtual layer block is calculated based on a total number of the virtual layer pointers that are stored in the flexibly sized virtual layer block to indicate the compressed blocks stored in the physical block. The total size of the flexibly sized virtual block is then stored into the virtual layer block.

In some embodiments, the logical address mapping tree maps logical addresses within a logical volume to locations of corresponding data in the non-volatile data storage.

In some embodiments, the disclosed technology binds the compressed data blocks stored in the physical block of non-volatile data storage to corresponding logical block addresses within the logical volume by storing leaf layer pointers within a leaf layer of the logical address mapping tree, where the leaf layer pointers point to the virtual layer pointers that are stored in the flexibly sized virtual layer block.

In some embodiments, storing of the compressed data blocks into the physical block of non-volatile data storage includes storing the compressed data blocks into the physical block of non-volatile data storage until the physical block of non-volatile data storage is full.

In some embodiments, the total number of the virtual layer pointers that are stored in the flexibly sized virtual layer block may be equal to the total number of the compressed data blocks stored into the physical block.

In some embodiments, the working set is deduplicated with regard to data blocks that were previously stored in the non-volatile data storage. In such embodiments, the data blocks in the working set that are compressed to generate the compressed data blocks are those of the data blocks in the working set that remain after the working set is deduplicated with regard to data blocks that were previously stored in the non-volatile data storage.

In some embodiments, each virtual layer pointer includes i) an offset within the physical block of the compressed data block that is indicated by that virtual layer pointer, and ii) a size of the compressed data block that is indicated by that virtual layer pointer.

In some embodiments, multiple pages may be allocated for the flexibly sized virtual layer block in response to the total number of the virtual layer pointers that are stored in the flexibly sized virtual layer block exceeding a maximum number of virtual layer pointers that can be stored in a single page of the flexibly sized virtual layer block.

In some embodiments, the total size of the flexibly sized virtual layer block is not a page aligned value (i.e. not a multiple of the page size used by the data storage system). For each one of the multiple pages allocated for the flexibly sized virtual block, a separate checksum is stored within that page. The separate checksum is calculated for only the portion of the flexibly sized virtual layer block that is stored within that page.

The disclosed technology is integral to providing a practical technical solution to the problem of storing virtual layer pointers indicating the specific locations of blocks of compressed data stored within a physical block of non-volatile data storage, to support flushing of data from a cache to non-volatile data storage. For each set of data blocks that is flushed to a physical block of non-volatile data storage, the specific total number of blocks of compressed data that are stored into the physical block depends on the amount of data reduction performed on the set of data blocks being flushed. Data reduction may include deduplication performed on each set of data blocks that is flushed. Deduplication reduces the number of blocks in the set of blocks being flushed by the number of those blocks that are duplicates of blocks that were previously stored into non-volatile data storage. The amount of data reduction achieved by deduplication varies between sets of blocks according to the number of duplicate blocks in each set. Data reduction may further include data compression performed on the remaining data blocks that are not duplicates of previously stored data blocks. The compression ratio achieved also varies between sets of data blocks, depending on various factors, e.g. compressibility of the specific data, availability of compression resources in the data storage system at the time of the flush operation, etc. As the data reduction varies for different sets of flushed data blocks, so does the total number of compressed blocks of data that can be stored within individual physical blocks. Accordingly, the total number of virtual layer pointers that are needed to point to the compressed blocks of data within any given physical block is not fixed, and varies with the specific number and sizes of the compressed blocks of data that are generated for the corresponding set of data blocks flushed from the cache.

In systems without the disclosed technology, in which fixed sized virtual layer blocks are used to store virtual layer pointers, the number of virtual layer pointers needed to indicate the compressed blocks of data stored into a single physical block may exceed the total number of virtual layer pointers that can be stored in a single fixed length virtual layer blocks. As a result, multiple fixed length virtual layer blocks may need to be allocated. Allocation of multiple fixed length virtual layer blocks is costly in terms of resource allocation and object maintenance. Operations involving a complete physical block may require access to all of the multiple virtual layer blocks allocated for that physical block, causing increased complexity and cost. In addition, if the virtual layer pointers for a physical block do not fill all of the fixed size virtual layer blocks allocated for indicating the compressed data blocks in that physical block, some part of the multiple fixed size virtual layer blocks is wasted. Moreover, if the total number of fixed sized virtual layer blocks that can be allocated for an individual physical block has an upper limit, then the physical block may not be fully utilized in the case where data compression generates a very large number of small blocks of compressed data.

These and other shortcomings of previous technologies using fixed size virtual layer blocks are addressed by the operation of the disclosed technology, in which flexibly sized virtual layer blocks can advantageously be used.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
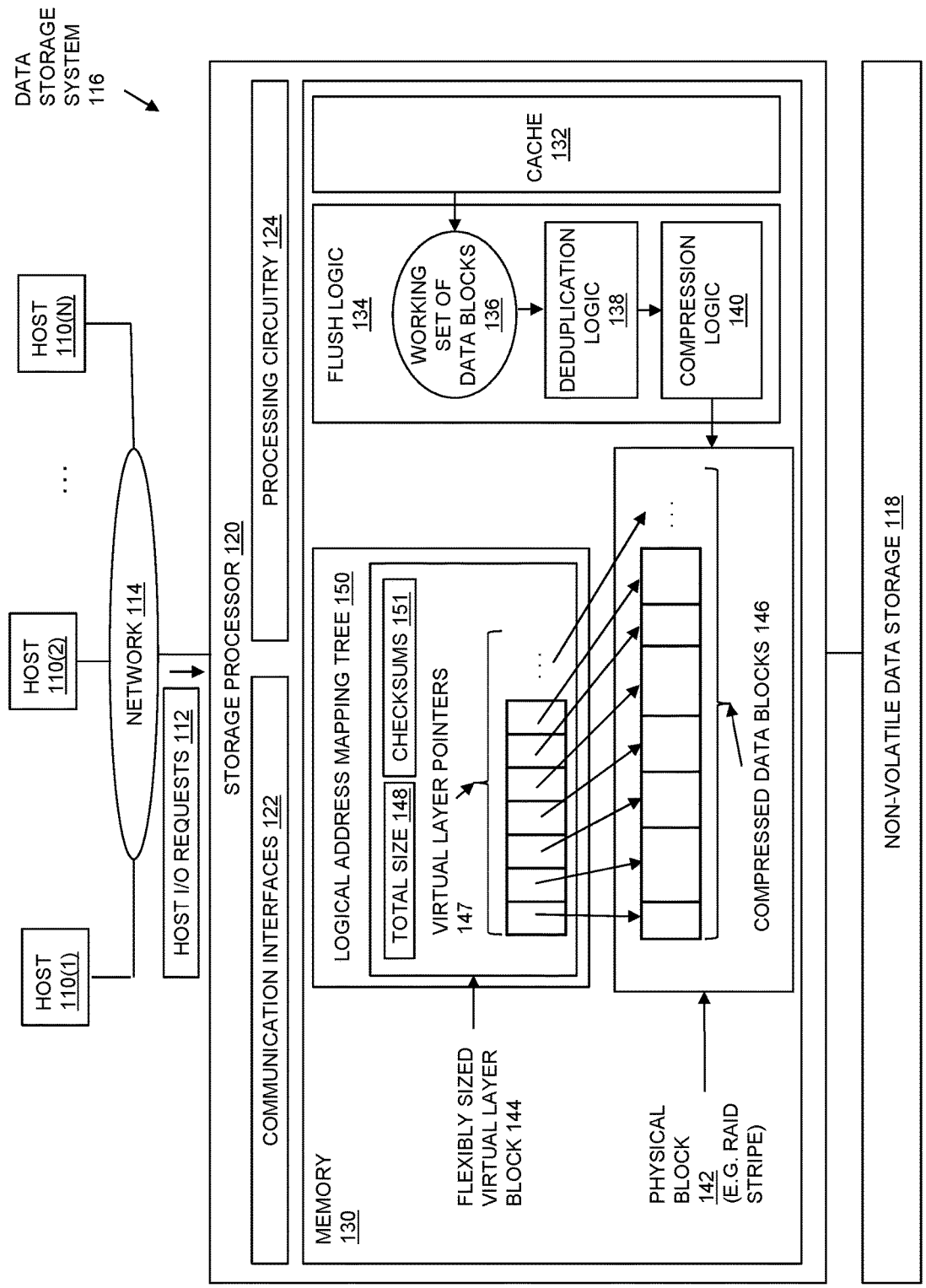
FIG. 1 is a block diagram showing an illustrative embodiment of the disclosed technology.

Embodiments will now be described with reference to the figures. The embodiments described herein are not limiting, and are provided only as examples, in order to illustrate various features and principles of the disclosed technology. The embodiments of disclosed technology described herein are integrated into a practical solution to the problem of storing virtual layer pointers indicating the specific locations of blocks of compressed data stored within a physical block of non-volatile data storage when data is flushed to non-volatile data storage during a cache flush.

The disclosed technology operates when a working set of data blocks to be flushed from a cache to non-volatile data storage is identified. A physical block of non-volatile data storage is allocated, and at least some of the data blocks in the working set are compressed to generate compressed data blocks. The compressed data blocks are then stored into the physical block of non-volatile data storage that was previously allocated. For each one of the compressed data blocks stored into the physical block, an independent virtual layer pointer indicating a location of that compressed data block within the physical block of non-volatile data storage is stored into a single, flexibly sized virtual layer block that is allocated for the working set, where the flexibly sized virtual layer block is part of a logical address mapping tree.

A total size of the flexibly sized virtual layer block is dynamically calculated. The total size of the flexibly sized virtual layer block is calculated based on a total number of the virtual layer pointers that are stored in the flexibly sized virtual layer block. The total size of the flexibly sized virtual block is stored into the virtual layer block.

The logical address mapping tree may map logical addresses to locations of corresponding data in the non-volatile data storage.

The compressed data blocks stored in the physical block of non-volatile data storage are bound to corresponding logical block addresses within the logical volume by storing leaf layer pointers within a leaf layer of the logical address mapping tree. The leaf layer pointers stored into the leaf layer point to the virtual layer pointers that were stored in the flexibly sized virtual layer block.

The compressed data blocks may be stored into the physical block of non-volatile data storage by storing the compressed data blocks into the physical block of non-volatile data storage until the physical block of non-volatile data storage is full.

The total number of the virtual layer pointers that are stored in the flexibly sized virtual layer block may be equal to the total number of the compressed data blocks that are stored into the physical block.

The working set may be deduplicated with regard to data blocks that were previously stored in the non-volatile data storage during the flush operation. For example, the data blocks in the working set that are compressed to generate the compressed data blocks may be those of the data blocks in the working set that remain after the working set is deduplicated with regard to data blocks that were previously stored in the non-volatile data storage.

Each virtual layer pointer may include both i) an offset of the compressed data block within the physical block of non-volatile data storage that is indicated by that virtual layer pointer, and ii) a size of the compressed data block within the physical block of non-volatile data storage that is indicated by that virtual layer pointer.

Multiple pages of memory may be allocated for the flexibly sized virtual layer block in the case where the total number of the virtual layer pointers that are stored in the flexibly sized virtual layer block exceeds a maximum number of virtual layer pointers that can be stored in a single page of the flexibly sized virtual layer block.

The total size of the flexibly sized virtual layer block need not be a page aligned value. For each one of multiple pages allocated for the flexibly sized virtual block, a separate checksum is stored within that page. The separate checksum for each page of the flexibly sized virtual layer block is calculated for only the portion of the flexibly sized virtual layer block that is stored within that page.

FIG. 1 shows an example of an operational environment in which embodiments of the disclosed technology may operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116 over a Network 114. Data Storage System 116 includes at least one Storage Processor 120 and Non-Volatile Data Storage 118. Data Storage System 116 may include one or more storage processors like Storage Processor 120. Storage Processor 120 may be any type of physical or virtual computing device that is capable of processing host I/O requests.

Non-Volatile Data Storage 118 may include or consist of solid state drives (SSDs), or some other specific type of storage drives, such as magnetic disk drives, electronic flash drives, optical drives, and/or other specific types of non-volatile data storage drives or devices.

Network 114 may include or consist of any specific type of computer/communication network and/or combination of networks.

Hosts 110(1-N) and/or host applications executing in whole or in part on Hosts 110(1-N) logically connect to and communicate with the Storage Processor 120. For example, Host I/O Requests 112 conveyed from Hosts 110(1-N) to Storage Processor 120 may include block I/O requests and/or file I/O requests. Storage Processor 120 may be configured to receive host I/O requests through block-based and/or file-based storage protocols, and to respond to host I/O requests of either type by reading and/or writing the Non-Volatile Data Storage 118.

Storage Processor 120 may include one or more Communication Interfaces 122, Processing Circuitry 124, and Memory 130. The Communication Interfaces 122 may include adapters that convert electronic and/or optical signals received over Network 114 into electronic form for use by Storage Processor 120.

Processing Circuitry 124 may be embodied as at least one processor core that is capable of independently reading and executing threads of program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120.

Memory 130 may include both volatile memory (e.g., RAM), and/or non-volatile memory (e.g. ROM, disk drives, solid state drives, portions of Non-Volatile Storage 118, etc.).

Processing Circuitry 124 and Memory 130 together form specialized control circuitry, which is constructed and arranged to carry out the specific methods and functions described herein. As shown in FIG. 1, Memory 130 stores software components and data structures that may be provided at least in part in the form of executable program instructions. When the executable instructions of the software components shown in FIG. 1 are executed by Processing Circuitry 124, Processing Circuitry 124 performs the methods and functionality of the software. Although certain specific software components are shown in FIG. 1, those skilled in the art will recognize that Memory 130 may further include various other specific software components, which are not shown.

In the example of FIG. 1, for purposes of illustration, the software components in Memory 130 include Flush Logic 134, which provides program logic for flushing data from Cache 132 into Non-Volatile Data Storage 118.

During operation of the illustrative embodiment shown in FIG. 1, Flush Logic 134 identifies Working Set of Data Blocks 136 within Cache 132, for the purpose of flushing Working Set of Data Blocks 136 from Cache 132 to Non-Volatile Data Storage 118. The data blocks in Working Set of Data Blocks 136 are dirty blocks of data in Cache 132 that need to be written to Non-Volatile Data Storage 118, and may be identified based on various factors. For example, the data blocks in each Working Set of Data Blocks 136 may be identified at least in part based on the proximity of the components within Logical Address Mapping Tree 150 that are needed to map the logical addresses of those data blocks to the locations at which they will be stored within Non-Volatile Data Storage 118, so that the flushing of Working Set of Data Blocks 136 can be performed efficiently with regard to how much of Logical Address Mapping Tree 150 is modified during the flushing.

Flush Logic 134 also allocates a physical block of Non-Volatile Data Storage 118 in which to store Working Set of Data Blocks 136, as shown in FIG. 1 by Physical Block 142. In some embodiments, Physical Block 142 may be a RAID (Redundant Array of Independent Disks) parity stripe formed (e.g. according to RAID 5 or RAID 6) across multiple drives in Non-Volatile Data Storage 118. For example, Physical Block 142 may be a block of non-volatile data storage having a fixed size, e.g. two megabytes (2 MB) of non-volatile data storage.

Flush Logic 134 performs data compression on some or all of the data blocks in Working Set of Data Blocks 136, e.g. using Compression Logic 140, in order to generate Compressed Data Blocks 146. Any specific type of lossless data compression may be used. As shown in FIG. 1, Flush Logic 134 stores the Compressed Data Blocks 146 into Physical Block 142.

In some embodiments, Flush Logic 134 deduplicates the data blocks in Working Set of Data Blocks 136, e.g. using Deduplication Logic 138, before using Compression Logic 140 to compress those data blocks that remain after deduplication. In such embodiments, Deduplication Logic 138 removes those data blocks from Working Set of Data Blocks 136 that are duplicates of data blocks that were previously stored into Non-Volatile Data Storage 118, and the removed data blocks are not used by Compression Logic 140 to generate Compressed Data Blocks 146. For each data block in Working Set of Data Blocks 136 that Deduplication Logic 138 identifies as a duplicate of a previously stored data block, Deduplication Logic 138 i) inserts a leaf layer pointer into the leaf layer of Logical Address Mapping Tree 150, the leaf layer pointer corresponding to a logical address of the duplicate data block and indicating a virtual layer pointer in a flexibly sized virtual layer block, where the virtual layer pointer indicates the location of the previously stored data block in a physical block, ii) increments a reference count associated with the previously stored data block, and iii) removes the duplicate data block from Working Set of Data Blocks 136.

Flush Logic 134 allocates Flexibly Sized Virtual Layer Block 144 while flushing Working Set of Data Blocks 136 to Non-Volatile Data Storage 118. For example, Flush Logic 134 may initially allocate one page (e.g. 4 KB of Memory 130) for Flexibly Sized Virtual Layer Block 144, and then allocate additional pages as needed depending on the total number of Virtual Layer Pointers 147. Flexibly Sized Virtual Layer Block 144 is part of Logical Address Mapping Tree 150. Logical Address Mapping Tree 150 maps logical addresses within a logical volume of storage in Non-Volatile Data Storage 118 to locations of corresponding data in Non-Volatile Data Storage 118. The logical volume may, for example, contain one or more host accessible data objects that are hosted by Data Storage System 116, and is used by Data Storage System 116 to store host data indicated by one or more write requests and provide access to previously stored host data in response to one or more read requests in Host I/O Requests 112.

For each one of the compressed data blocks in the Compressed Data Blocks 146 that Flush Logic 134 stores into Physical Block 142, Flush Logic 134 stores a corresponding independent virtual layer pointer indicating the location at which that compressed data block was stored within Physical Block 142 into Flexibly Sized Virtual Layer Block 144, as shown by Virtual Layer Pointers 147.

Flush Logic 134 dynamically calculates a total size of Flexibly Sized Virtual Layer Block 144. The total size of Flexibly Sized Virtual Layer Block 144 is calculated based on the total number of Virtual Layer Pointers 147 that Flush Logic 134 stores in Flexibly Sized Virtual Layer Block 144 to indicate the Compressed Data Blocks 146 stored in Physical Block 142. Flush Logic 134 stores the total size of Flexibly Sized Virtual Layer Block 144 into Flexibly Sized Virtual Layer Block 144, as shown by Total Size 138.

Flush Logic 134 binds Compressed Data Blocks 146 stored in Physical Block 142 to corresponding logical block addresses within the logical volume by storing leaf layer pointers within a leaf layer of the Logical Address Mapping Tree 150. The leaf layer pointers point to the Virtual Layer Pointers 147 that are stored in Flexibly Sized Virtual Layer Block 144. After Compressed Data Blocks 146 are bound to corresponding logical block addresses, the Compressed Data Blocks 146 can be located based on their corresponding logical block addresses using the Logical Address Mapping Tree 150.

Flush Logic 134 may store the Compressed Data Blocks 146 into Physical Block 142 by storing compressed data blocks into Physical Block 142 until Physical Block 142 is full, e.g. all 2 MB of Physical Block 142 have been used to store blocks of compressed data.

The total number of the Virtual Layer Pointers 147 that are stored by Flush Logic 134 into Flexibly Sized Virtual Layer Block 144 may be equal to the total number of the Compressed Data Blocks 146 stored into Physical Block 142.

For example, each one of the virtual layer pointers in Virtual Layer Pointers 147 may include i) an offset within Physical Block 142 of the corresponding compressed data block in Compressed Data Blocks 146 that is indicated by that virtual layer pointer, and ii) a size of the corresponding compressed data block in Compressed Data Blocks 146 that is indicated by that virtual layer pointer.

Flush Logic 134 may allocate multiple pages of Memory 130 for Flexibly Sized Virtual Layer Block 144 in response to the total number of Virtual Layer Pointers 147 that are stored in Flexibly Sized Virtual Layer Block 144 exceeding a maximum number of virtual layer pointers that can be stored in a single page of Flexibly Sized Virtual Layer Block 144. For example, in some embodiments, a maximum of 512 virtual layer pointers may be stored in each page of Flexibly Sized Virtual Layer Block 144.

The Total Size of Flexibly Sized Virtual Layer Block 144 may not be a page aligned value, i.e. may not be an exact multiple of the page size. Flush Logic 134 may store a separate checksum into each page of Flexibly Sized Virtual Layer Block 144, as shown by Checksums 151. For each page of Flexibly Sized Virtual Layer Block 144, the page-specific checksum is calculated for only the portion of Flexibly Sized Virtual Layer Block 144 that is stored within that page. Accordingly, if a last page allocated to Flexibly Sized Virtual Layer Block 144 is only partly filled with a portion of Flexibly Sized Virtual Layer Block 144 that is less than a whole page, then the page-specific checksum for that page is calculated using only the portion of that page that contains the portion of Flexibly Sized Virtual Layer Block 144, and any data stored in the rest of that page is ignored during the checksum calculation.

Figure 2:
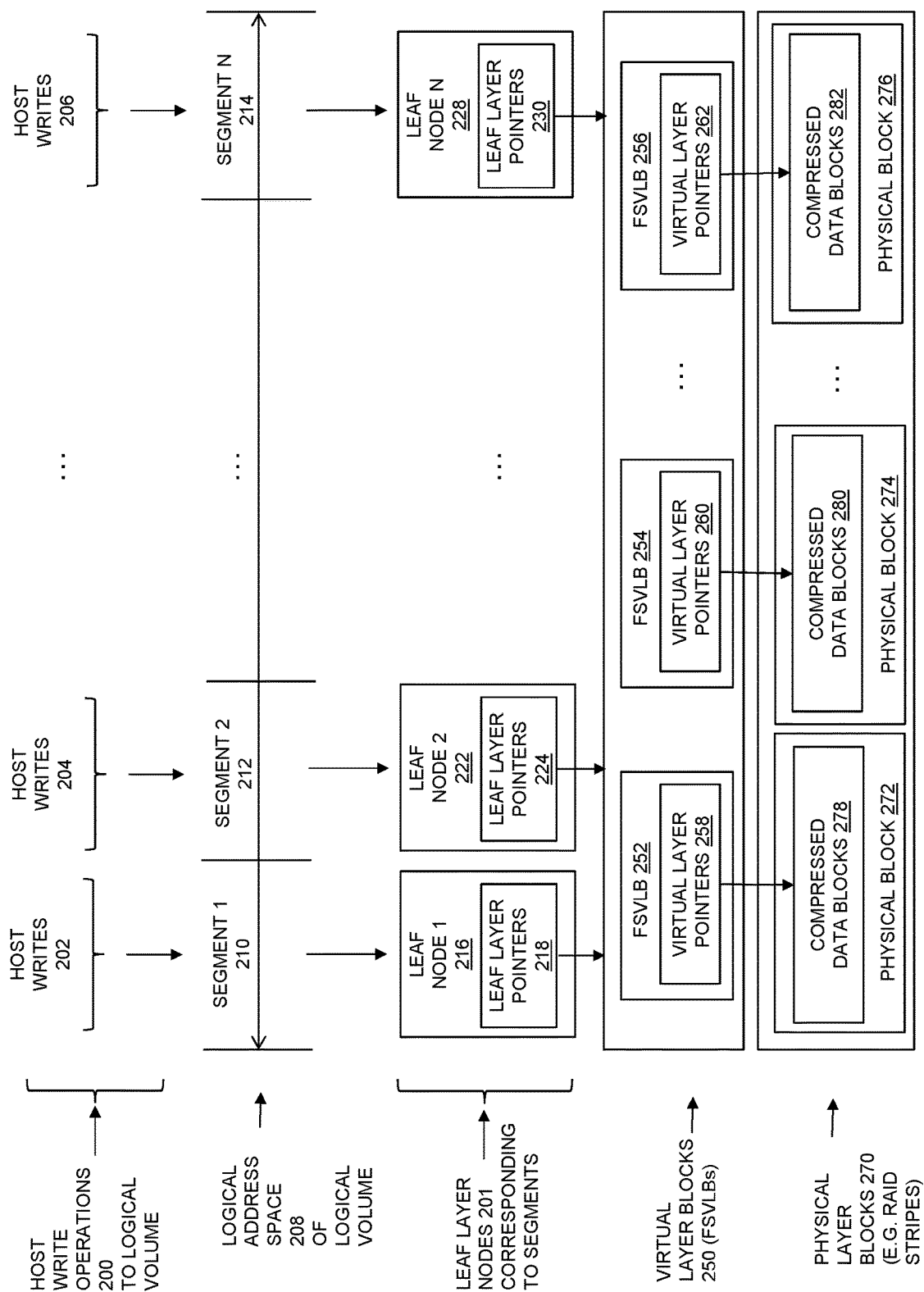
FIG. 2 is a block diagram showing an example of some components in a logical address mapping tree for a logical volume in some embodiments.

FIG. 2 is a block diagram showing an example of segments in a Logical Address Space 208 of a logical volume, and of the corresponding Leaf Layer Nodes 201 in a logical address mapping tree for the logical volume. As shown in FIG. 2, Logical Address Space 208 may be divided into segments, shown by Segment 1 210, Segment 2 212, and so on through Segment N 214. The disclosed technology may be embodied using any specific length of logical address space, and various specific sizes of segments within the logical address space. For example, each segment within the Logical Address Space 208 may have a size of 2 MB. In such an example, each leaf layer node may store up to 512 pointers, each of which points to a virtual layer pointer that points to the location at which a compressed data block is stored within a physical block. For example, the each compressed data block may be the result of compressing a corresponding 4 KB of uncompressed data, and the size of each compressed data block may be a function of the compression ratio achieved when the corresponding 4 KB of uncompressed data was compressed, e.g. by Compression Logic 140 during a flush operation.

In the example of FIG. 2, Leaf Node 1 216 corresponds to Segment 1 210, Leaf Node 2 222 corresponds to Segment 2 212, and so on through Leaf Node N 228, which corresponds to Segment N 214.

Each leaf node in the Leaf Layer Nodes 201 contains leaf layer pointers that point to virtual layer pointers contained in Virtual Layer Blocks 250. Virtual Layer Blocks 250 includes some number of flexibly sized virtual layer blocks (FSVLBs), shown for purposes of illustration by Flexibly Sized Virtual Layer Block 252, Flexibly Sized Virtual Layer Block 254, and so on through Flexibly Sized Virtual Layer Block 256. Physical Layer Blocks 270 includes some number of physical blocks, shown for purposes of illustration by Physical Block 272, Physical Block 274, and so on through Physical Block 276. Each one of the physical blocks in Physical Layer Blocks 270 is a chunk of non-volatile data storage, e.g. a single RAID stripe, that can be used to store variably sized blocks of compressed data. For example, Physical Block 272 is shown storing Compressed Data Blocks 278, Physical Block 274 is shown storing Compressed Data Blocks 280, and so on through Physical Block 276, which is shown storing Compressed Data Blocks 282.

Each flexibly sized virtual layer block (FSVLB) in Virtual Layer Blocks 250 corresponds to one of the physical blocks in Physical Layer Blocks 270. For example, Flexibly Sized Virtual Layer Block 252 corresponds to Physical Block 272, Flexibly Sized Virtual Layer Block 254 corresponds to Physical Block 274, and so on, through Flexibly Sized Virtual Layer Block 256, which corresponds to Physical Block 276. In general, the virtual layer pointers in a virtual block point to compressed data blocks in the corresponding physical block. Accordingly, Virtual Layer Pointers 258 in Flexibly Sized Virtual Layer Block 252 point to Compressed Data Blocks 278 in Physical Block 272, Virtual Layer Pointers 260 in Flexibly Sized Virtual Layer Block 254 point to Compressed Data Blocks 280 in Physical Block 274, and so on, through Virtual Layer Pointers 262 in Flexibly Sized Virtual Layer Block 256, which point to Compressed Data Blocks 282 in Physical Block 276. Each virtual layer pointer in a flexibly sized virtual layer block points to a compressed version of a block of host data written to the segment or segments of the logical address space corresponding to one or more leaf nodes that include pointers to that pointer. Accordingly, Leaf Node 1 216 contains Leaf Layer Pointers 218 that point to virtual layer pointers in the flexibly sized virtual layer blocks of Virtual Layer Blocks 250 that point to compressed data blocks in Physical Layer 270 that are compressed versions of host data indicated by Host Writes 202, because Host Writes 202 are directed to logical addresses (e.g. logical block addresses sometimes referred to as "LBAs") that fall within Segment 1 210. Leaf Node 2 222 contains Leaf Layer Pointers 224 that point to virtual layer pointers in the flexibly sized virtual layer blocks of Virtual Layer Blocks 250 that point to compressed data blocks in Physical Layer 270 that are compressed versions of host data indicated by Host Writes 204, because Host Writes 204 are directed to logical addresses (e.g. "LBAs") that fall within Segment 2 212. The Leaf Level Nodes 201 continue on similarly through Leaf Node N 228, which contains Leaf Layer Pointers 230 that point to virtual layer pointers in the flexibly sized virtual layer blocks of Virtual Layer Blocks 250 that point to compressed data blocks in Physical Layer 270 that are compressed versions of host data indicated by Host Writes 206, because Host Writes 206 are directed to logical addresses (e.g. "LBAs") that fall within Segment N 214.

The pointers in a given leaf node may be arranged sequentially, in correspondence with an order of LBAs within the corresponding segment of the logical address space. For example, a first pointer in Leaf Layer Pointers 218 may point to a virtual layer pointer that points to a compressed data block that is the compressed version of the host data indicated by a write operation directed to a first LBA within Segment 1 210 (e.g. the lowest LBA in the segment), a second pointer in Leaf Layer Pointers 218 may point to compressed data block that is the compressed version of the host data indicated by a write operation directed to a second LBA within Segment 1 210 (e.g. the second lowest LBA in the segment), and so on.

Figure 3:
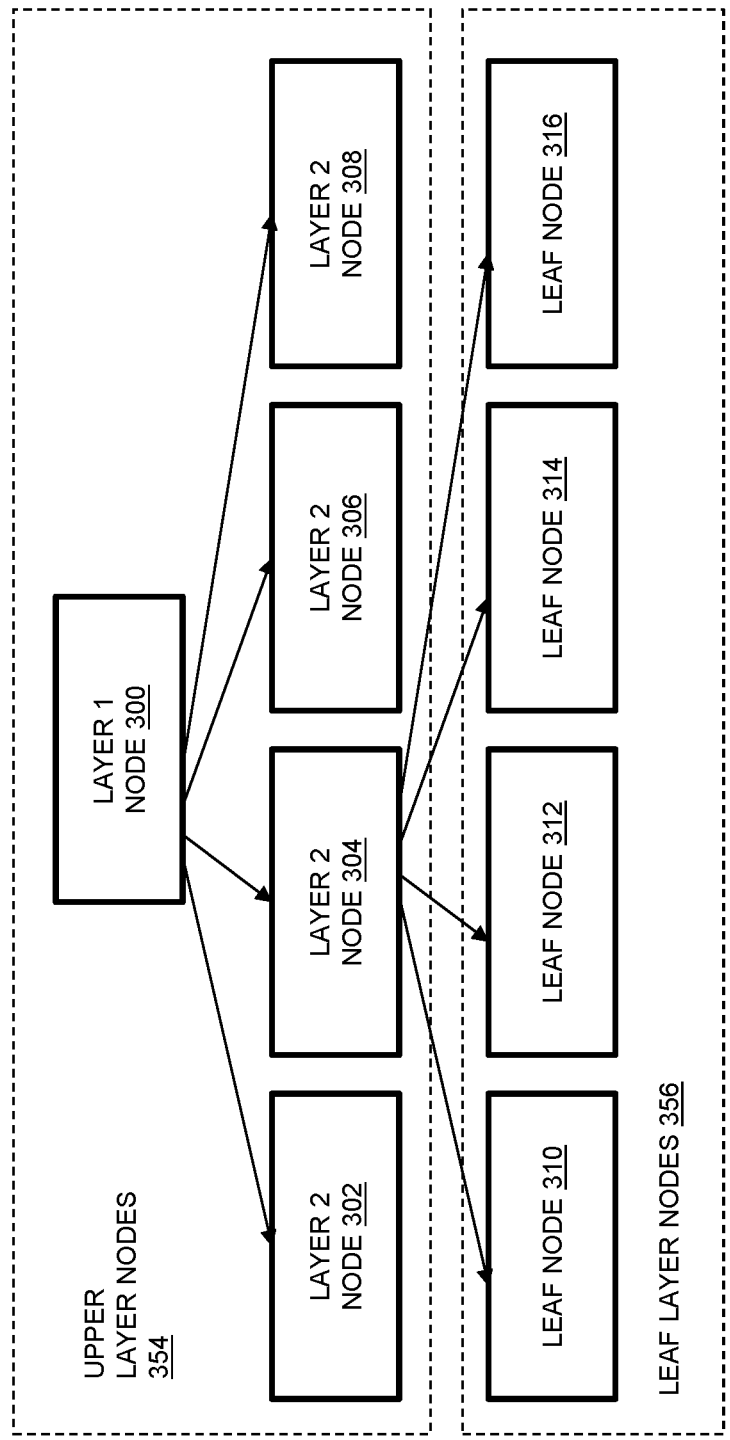
FIG. 3 is a block diagram showing a simplified example of some components in a logical address mapping tree in some embodiments.

FIG. 3 is a block diagram showing a simplified example of upper portions of a logical address mapping tree in some embodiments. In the example of FIG. 3, the Upper Layer Nodes 354 include two layers: a first layer (also referred to as "layer 1"), and a second layer (also referred to as "layer 2"). The first layer is shown including a Layer 1 Node 300. The second layer is shown including Layer 2 Node 302, Layer 2 Node 304, Layer 2 Node 306, and Layer 2 Node 308. The Leaf Layer Nodes 356 include Leaf Node 310, Leaf Node 312, Leaf Node 314, and Leaf Node 316.

In the example of FIG. 3, each layer 1 node may contain pointers to a maximum of N layer 2 nodes, each layer 2 node may contain pointers to a maximum of N layer 3 nodes, e.g. where N=512.

Each leaf node in Leaf Layer Nodes 356 contains pointers to virtual layer pointers that point to compressed blocks of data. For example, each leaf node in Leaf Layer Nodes 356 may contain a maximum of N (e.g. 512) pointers to virtual layer pointers that point to compressed blocks of data that are compressed versions of host data written to the segment of the logical address space corresponding to that leaf node.

Figure 4:
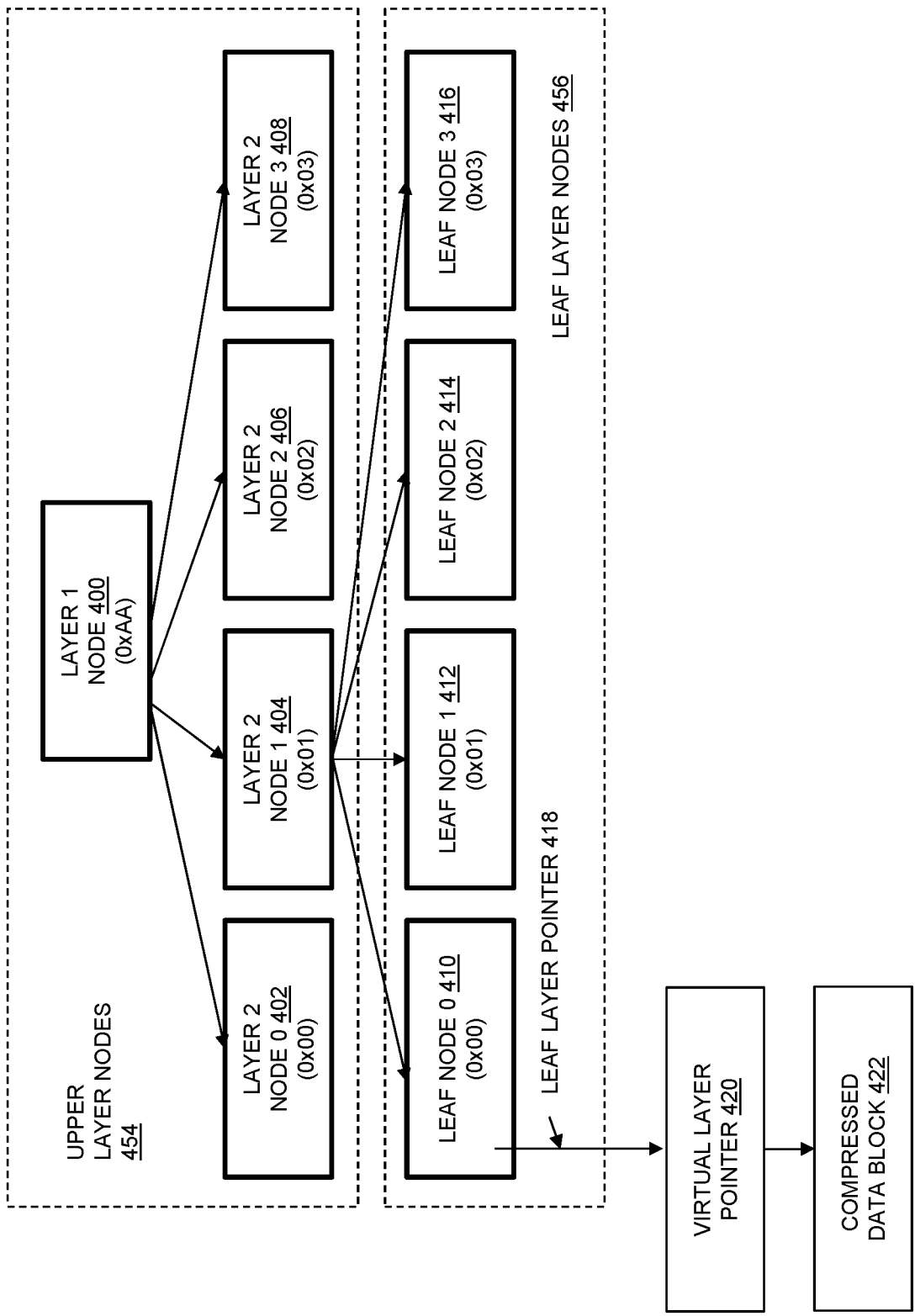
FIG. 4 is a block diagram showing another simplified example of some components in a logical address mapping tree in some embodiments, and illustrating a traversal of the mapper tree to locate a compressed data block in non-volatile data storage.

FIG. 4 is a block diagram showing another simplified example of a logical address mapping tree in some embodiments, showing a traversal of the logical address mapping tree to find a compressed data block. The Upper Layer Nodes 454 in FIG. 4 include two layers: a first layer (referred to as "layer 1"), and a second layer (referred to as "layer 2"). The first layer is shown including a Layer 1 Node 400. The second layer is shown including Layer 2 Node 0 402, Layer 2 Node 1 404, Layer 2 Node 3 406, and Layer 2 Node 4 408. The Leaf Layer Nodes 456 include Leaf Node 0 410, Leaf Node 1 412, Leaf Node 2 414, and Leaf Node 3 416.

In the example of FIG. 4, each node may contain a maximum number N pointers to nodes in the next lower layer, e.g. N=256. Also in the example of FIG. 4, each LBA within the logical address space indicates a 4 KB block within the logical address space, which is mapped to the location in non-volatile data storage of a compressed data block that is the compressed version of host data written to that 4 KB block within the logical address space. Each leaf pointer in a leaf node within the Leaf Layer Nodes 456 points to a virtual layer pointer that points to the location of a compressed data block in the non-volatile data storage. Accordingly, in the example of FIG. 4, each leaf node in Leaf Layer Nodes 456 may contain up to 256 pointers to virtual layer pointers that each indicate the location of a compressed data block for a 4 KB blocks of host data in the non-volatile data storage. Accordingly, each leaf node in Leaf Layer Nodes 456 corresponds to a 1 MB segment within the logical address space. Each layer 2 node may contain up to 256 pointers to leaf nodes in the Leaf Layer Nodes 456, and accordingly each layer 2 node corresponds to 256 MB within the logical address space. Each layer 1 node may contain up to 256 pointers to layer 2 nodes, and accordingly each layer 1 node corresponds to 64 GB within the logical address space.

Further with reference to the example of FIG. 4, the logical addresses within the logical address space may be logical block addresses (LBAs). Each layer 1 node is associated with a highest offset within the LBA, each layer 2 node is associated with a second highest offset within the LBA, and each leaf node in the Leaf Layer Nodes 456 is associated with a third highest offset within the LBA.

For example, in order to process a read operation directed to LBA 0xAA010000000 within the logical address space of the logical volume, a node in Layer 1 is first visited that corresponds to the value of the highest offset within the LBA, e.g. a node in Layer 1 that corresponds to 0xAA. In FIG. 1, Layer 1 Node 400 corresponds to a highest offset value of 0xAA. In order to identify the next node to be visited during the traversal (i.e. the node within Layer 2 to be visited after Layer 1 Node 400), a pointer within Layer 1 Node 400 is then located that corresponds to the value of the next highest offset within the LBA. In this example, the value of the next highest offset within the LBA is 0x01, and the pointer in Layer 1 Node 400 is located that corresponds to 0x01, e.g. the pointer in the 0x01 position within the pointers contained in Layer 1 Node 400, which is a pointer to Layer 2 Node 1 404.

A pointer within Layer 2 Node 1 404 is then located that corresponds to the value of the next highest offset within the LBA. In this example, the value of the next highest offset within the LBA is 0x00, and the pointer in Layer 2 Node 404 is located that corresponds to 0x00, e.g. the pointer in the 0x00 position within the pointers contained in Layer 2 Node 404, which is a pointer to Leaf Node 0 410.

A pointer within Leaf Node 0 410 is then located that corresponds to the value of the next highest offset within the LBA. In this example, the value of the next highest offset within the LBA is 0x00, and the pointer in Leaf Node 0 410 is located that corresponds to 0x00, e.g. a Leaf Layer Pointer 418 that is located within the 0x00 position within the pointers contained in Leaf Node 0 410. Leaf Layer Pointer 418 points to Virtual Layer Pointer 420. Virtual Layer Pointer 420 may be a pointer contained within the virtual block layer, e.g. Virtual Layer Pointer 420 may be a pointer contained within one of the flexibly sized virtual layer blocks in Virtual Layer Blocks 250 shown in FIG. 2. Virtual Layer Pointer 420 points to a location of Compressed Data Block 422 in non-volatile data storage (e.g. an offset within the physical block that correspond to the flexibly sized virtual layer block that contains Virtual Layer Pointer 420), which is used to store (e.g. from cache during a flush operation) the compressed version of host data indicated by a previous write operation directed to LBA 0xAA010000000 within the logical address space of the logical volume.

The above example describes using an LBA of the logical volume in order to locate a compressed data block. Those skilled in the art will recognize that the logical address mapping tree may be traversed while processing a read operation directed to an LBA of the logical volume in order to locate a compressed data block that is read from non-volatile data storage, and then decompressed to provide the host data that is returned to the host in response to the read operation.

Figure 5:
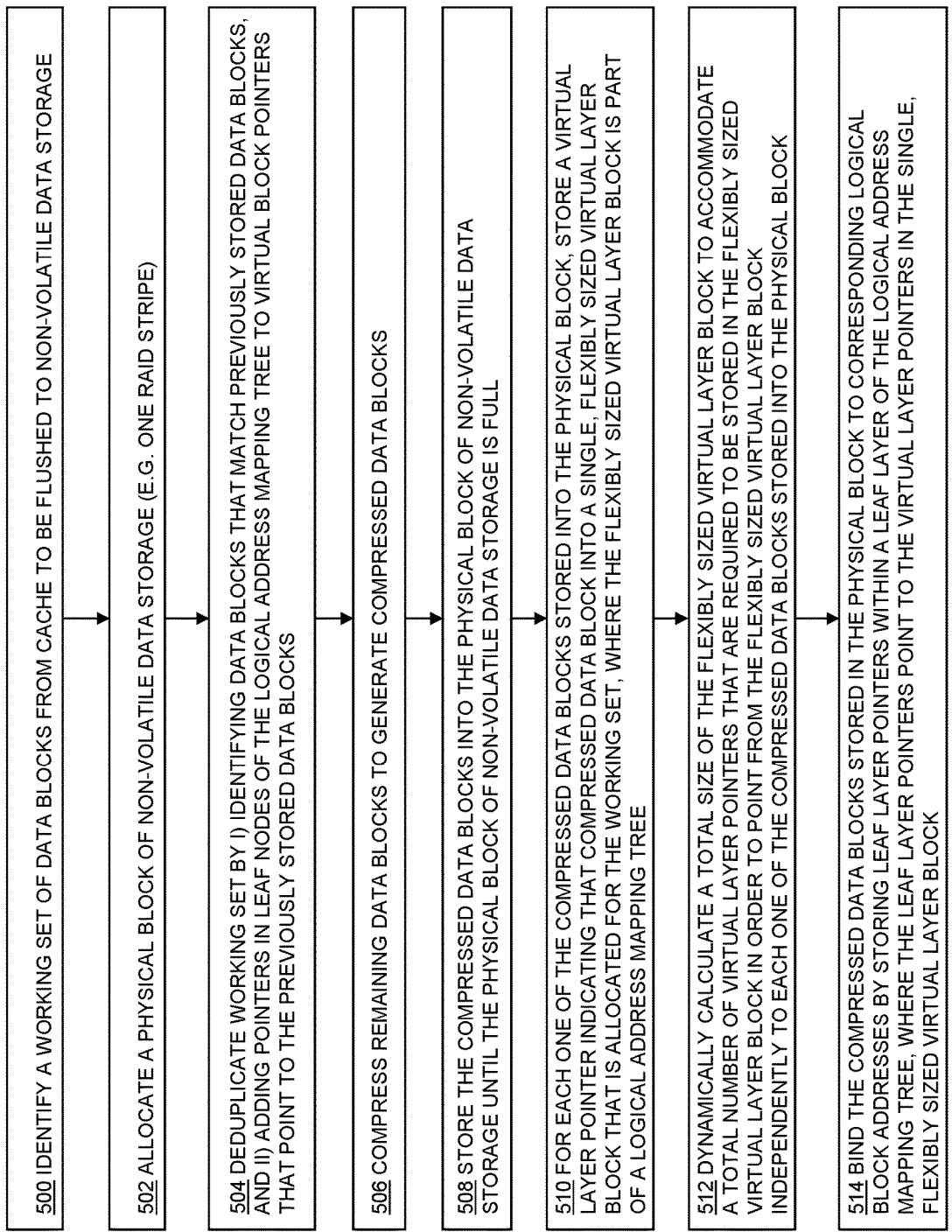
FIG. 5 is a first flow chart showing an example of steps performed in some embodiments.

FIG. 5 is a first flow chart showing an example of steps performed in some embodiments.

At step 500, a working set of data blocks in the cache is identified that is to be flushed from the cache to non-volatile data storage.

At step 502, a physical block of non-volatile data storage (e.g. one raid stripe) is allocated for use during the cache flush to store compressed blocks of data generated from the working set.

At step 504, the working set may be deduplicated by i) identifying data blocks in the working set that match previously stored data blocks, and ii) for any data blocks in the working set identified as matching previously stored data blocks, instead of storing the identified data blocks into the non-volatile data storage, removing the identified data blocks from the working set and adding leaf layer pointers into the leaf nodes that map the logical block numbers for the identified data blocks, where the added pointers point to existing virtual block pointers that point to the previously stored data blocks.

At step 506, those data blocks remaining in the working set after the removal at step 504 of the data blocks matching previously stored data blocks are compressed to generate compressed data blocks.

At step 508, the compressed data blocks generated at step 506 are stored into the physical block of non-volatile data storage allocated at step 502, e.g. until the physical block of non-volatile data storage is full.

At step 510, for each one of the compressed data blocks stored into the physical block at step 508, a virtual layer pointer indicating that compressed data block is stored into a single, flexibly sized virtual layer block that is allocated for the working set. The flexibly sized virtual layer block is part of a logical address mapping tree, e.g. as described above with reference to FIGS. 1-4. Those skilled in the art will recognize that steps 508 and 510 may be performed wholly or partly in parallel.

At step 512, a total size of the flexibly sized virtual layer block is dynamically calculated. The total size is sufficient to accommodate a total number of the virtual layer pointers that are required to be stored in the flexibly sized virtual layer block in order to point from the flexibly sized virtual layer block independently to each one of the compressed data blocks stored into the physical block.

At step 514, the compressed data blocks stored in the physical block are bound to corresponding logical block addresses (LBAs) by storing leaf layer pointers within a leaf layer of the logical address mapping tree, where the leaf layer pointers point to the virtual layer pointers that were stored in the single, flexibly sized virtual layer block. After the compressed data blocks are bound to their corresponding logical block addresses, the compressed data blocks can be located based on their corresponding logical block addresses using the logical address mapping tree.

Figure 6:
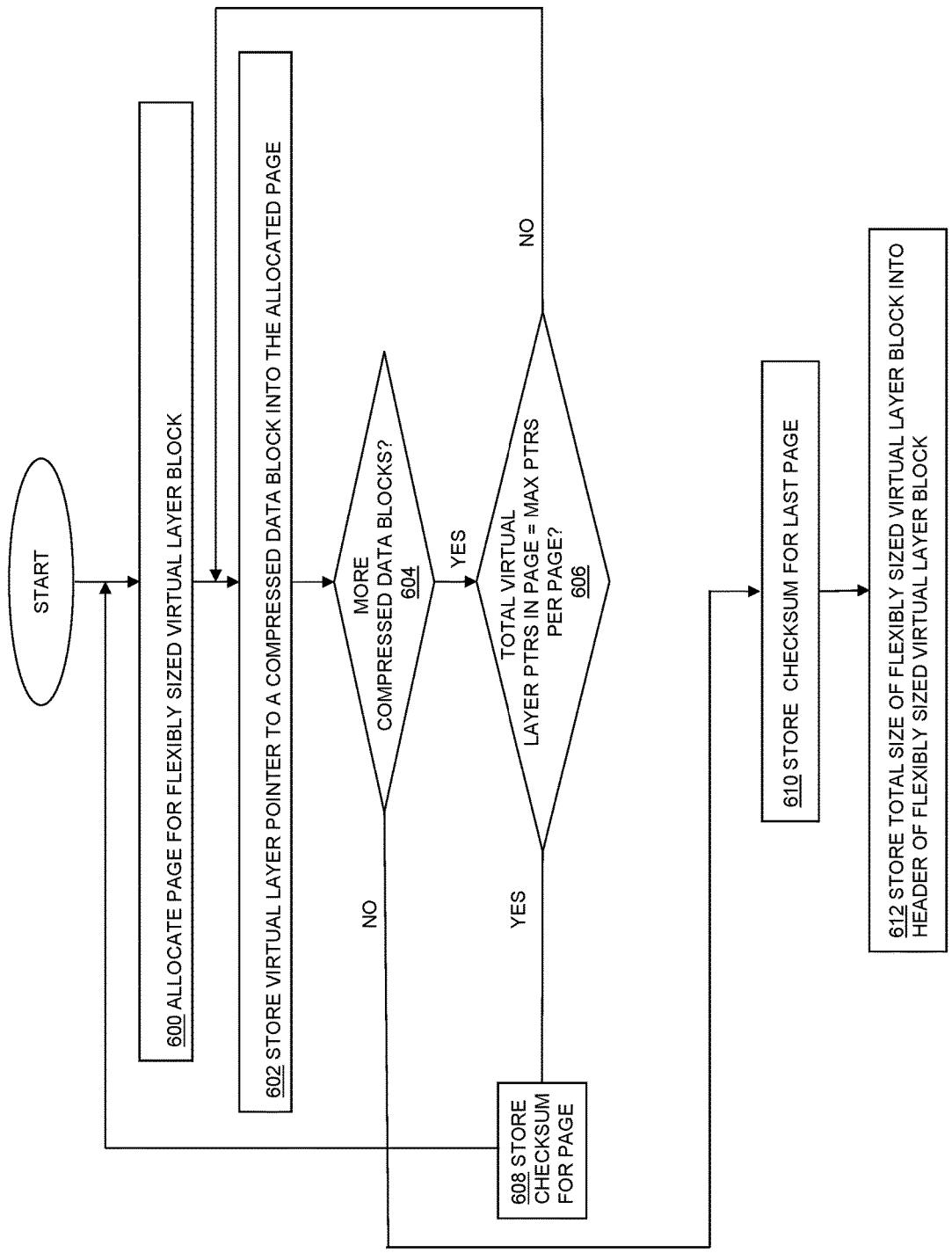
FIG. 6 is a second flow chart showing a second example of steps performed in some embodiments.

FIG. 6 is a second flow chart showing a second example of steps performed in some embodiments. The steps of FIG. 6 are an example of steps performed in some embodiments at steps 510 and 512 of FIG. 5 in order to generate a flexibly sized virtual layer block for those compressed data blocks that i) were generated from the data blocks in the identified working set after performing deduplication on the working set (e.g. at step 506 in FIG. 5), and ii) have been stored into the allocated physical block (e.g. at step 508 in FIG. 5).

At step 600, a page is allocated for the flexibly sized virtual layer block, e.g. a 4 KB page of memory.

At step 602, a virtual layer pointer indicating the location of a compressed data block is stored into the page allocated at step 600. The virtual layer pointer may include an offset of the compressed data block within the physical block corresponding to the flexibly sized virtual layer block, as well as a size of the compressed data block.

At step 604, the disclosed technology determines whether there are any more compressed blocks for which a virtual layer pointer needs to be stored into the flexibly sized virtual layer block. If so, step 604 is followed by step 606. Otherwise, step 604 is followed by step 610.

At step 606, the disclosed technology determines whether a total number of virtual layer pointers that have been stored into the page allocated at step 602 is equal to a maximum number of virtual layer pointers (e.g. 512) that can be loaded into a single page of the flexibly sized virtual layer block. If so, then step 606 is followed by step 608. At step 608, a checksum is generated for the virtual layer pointers and/or other data stored into the page allocated at step 600. The checksum is then stored into the page allocated at step 600. Step 608 is followed by step 600, in which another page is allocated for the flexibly sized virtual layer block.

If the disclosed technology determines at step 606 that the total number of virtual layer pointers that have been stored into the page allocated at step 602 is not yet equal to the maximum number of virtual layer pointers that can be loaded into a single page of the flexibly sized virtual layer block, step 606 is followed by step 602, at which another virtual layer pointer is stored into the page allocated at step 600.

At step 610, the disclosed technology generates a checksum for the virtual layer pointers and/or other data stored into the last page allocated for the flexibly sized virtual layer block. The checksum for the last page allocated for the flexibly sized virtual layer block is calculated only for the virtual layer pointers and/or other data of the flexibly size virtual layer pointer that is stored in the last page allocated for the flexibly size virtual layer block. Any unused portion of the last page allocated for the flexibly sized virtual layer block is not used when calculating the checksum at step 610. The checksum generated at step 610 is then stored into the last page allocated for the flexibly sized virtual layer block.

Step 610 is followed by step 612. At step 612, a total size of the flexibly sized virtual layer block is stored into the flexibly sized virtual layer block, e.g. into a header of the flexibly sized virtual layer block. The total size may, for example, be calculated as the total number of pages allocated for the flexibly sized virtual layer block minus one, multiplied by the page size, plus the amount of space within the last page that was allocated for the flexibly size virtual layer block that was used to store virtual layer pointers and/or other data of the flexibly sized virtual layer block.

Figure 7:
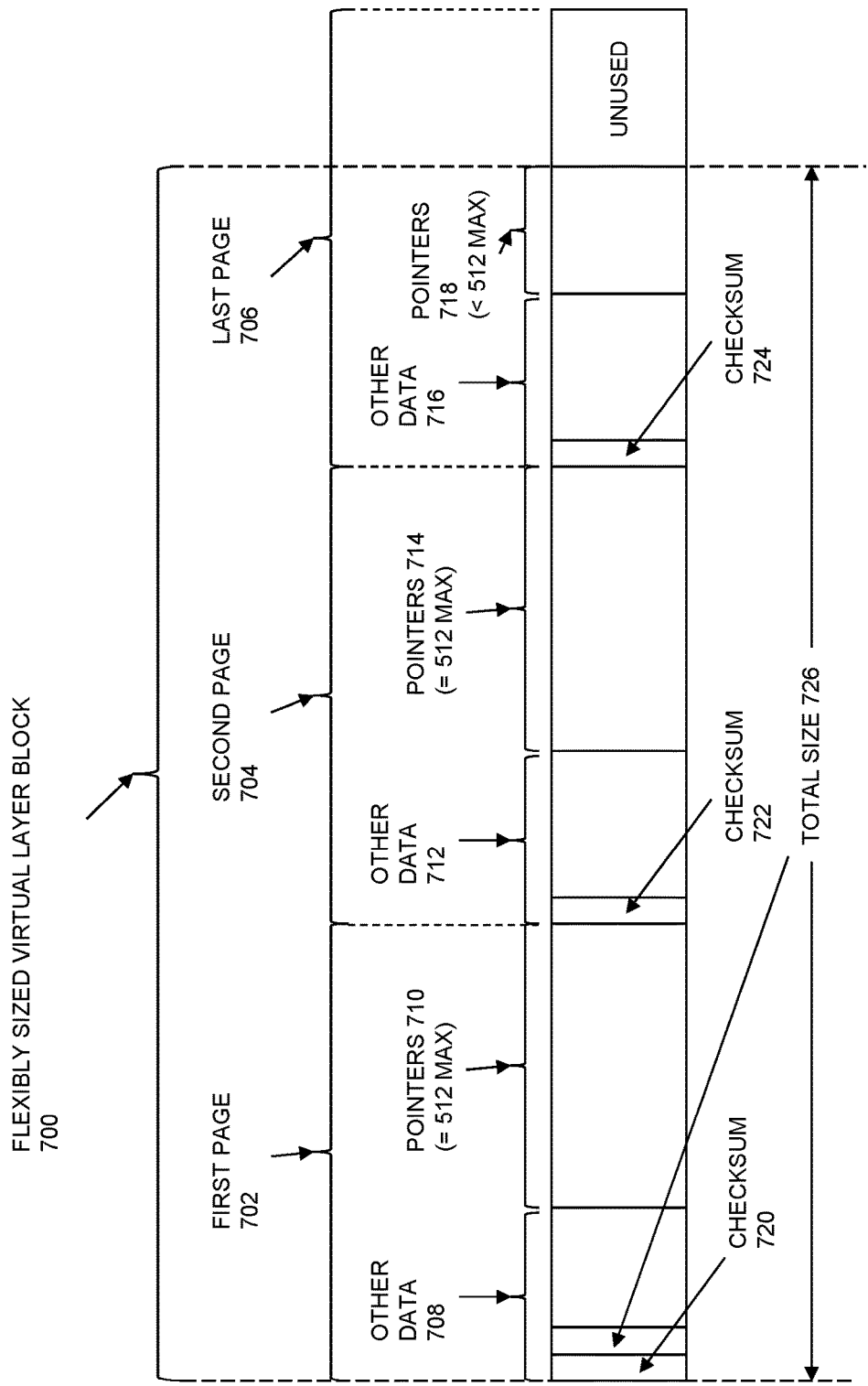
FIG. 7 is a block diagram showing an example of a flexibly sized virtual layer block.

FIG. 7 is a block diagram showing an example of a Flexibly Sized Virtual Layer Block 700. Three pages of memory were allocated for Flexibly Sized Virtual Layer Block 700, shown by First Page 702, Second Page 704, and Last Page 706. First Page 702 stores Other Data 708 and Pointers 710. Pointers 710 contains the maximum number of virtual layer pointers that can be stored in a single page, e.g. 512. Second Page 704 stores Other Data 712 and Pointers 714. Pointers 714 also contains the maximum number of virtual layer pointers that can be stored in a single page. The Last Page 706 stores Other Data 716 and Pointers 718. Pointers 718 contains less than the maximum number of virtual layer pointers that can be stored in a single page, e.g. less than 512 virtual layer pointers.

As also shown in FIG. 7, Other Data 708 contains a Checksum 720. Checksum 720 is a checksum calculated for the entire contents of First Page 702, i.e. including both Other Data 708 and Pointers 710. Other Data 712 contains a Checksum 722. Checksum 722 is a checksum calculated for the entire contents of Second Page 704, i.e. including both Other Data 712 and Pointers 714. Other Data 716 contains a Checksum 724. Checksum 724 is calculated only for the portion of Last Page 706 used to store Pointers 718 and other data of Flexibly Sized Virtual Layer Block 700 stored in Last Page 706. Checksum 724 is not based on any unused portion of Last Page 706.

As also shown in FIG. 7, a Total Size 726 of Flexibly Sized Virtual Layer Block 700 is stored in Flexibly Sized Virtual Layer Block 700, e.g. into a header of Flexibly Sized Virtual Layer Block 700. The Total Size 726 includes the size of First Page 702 (e.g. 4 KB), the size of Second Page 704 (e.g. 4 KB), and the portion of Last Page 706 that is used to store elements of Flexibly Sized Virtual Layer Block 700, e.g. that is used to store Pointers 718 and/or Other Data 716 of Flexibly Sized Virtual Layer Block 700. The Total Size 726 does not include the unused portion of Last Page 706.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
  identifying a working set of data blocks from a cache to flush to non-volatile data storage in a data storage system;
  allocating a physical block of the non-volatile data storage;

compressing a plurality of data blocks in the working set to generate compressed data blocks;

storing the compressed data blocks into the physical block of non-volatile data storage until the physical block of non-volatile data storage is full;

for each one of the compressed data blocks stored into the physical block, storing an independent virtual layer pointer indicating a location of that compressed data block within the physical block of non-volatile data storage into a single, flexibly sized virtual layer block that is allocated for the working set, wherein the flexibly sized virtual layer block is part of a logical address mapping tree;

dynamically calculating a total size of the flexibly sized virtual layer block, wherein the total size of the flexibly sized virtual layer block is calculated based on a total number of the virtual layer pointers that are stored in the flexibly sized virtual layer block, wherein the total size of the flexibly sized virtual layer block is calculated as an amount equal to a total number of pages allocated for the flexibly sized virtual layer block minus one, multiplied by a page size used by the data storage system, plus an amount of space that was used to store virtual layer pointers within a last page that was allocated for the flexibly size virtual layer block; and storing the total size of the flexibly sized virtual layer block into the flexibly sized virtual layer block.

2. The method of claim 1, wherein the logical address mapping tree maps logical addresses within a logical volume to locations of corresponding data in the non-volatile data storage.

3. The method of claim 2, further comprising binding the compressed data blocks stored in the physical block of non-volatile data storage to corresponding logical block addresses within the logical volume by storing leaf layer pointers within a leaf layer of the logical address mapping tree, wherein the leaf layer pointers point to the virtual layer pointers stored in the flexibly sized virtual layer block.

4. The method of claim 3, wherein storing the compressed data blocks into the physical block of non-volatile data storage comprises storing the compressed data blocks into the physical block of non-volatile data storage until the physical block of non-volatile data storage is full.

5. The method of claim 4, wherein the total number of the virtual layer pointers that are stored in the flexibly sized virtual layer block is equal to a total number of the compressed data blocks stored into the physical block.

6. The method of claim 5, further comprising:

deduplicating the working set with regard to data blocks that were previously stored in the non-volatile data storage; and wherein the plurality of data blocks in the working set that are compressed to generate the compressed data blocks are those of the data blocks in the working set that remain after the working set is deduplicated with regard to data blocks that were previously stored in the non-volatile data storage.

7. The method of claim 6, wherein each virtual layer pointer comprises i) an offset of the compressed data block within the physical block of non-volatile data storage that is indicated by that virtual layer pointer, and ii) a size of the compressed data block within the physical block of non-volatile data storage that is indicated by that virtual layer pointer.

8. The method of claim 7, further comprising allocating multiple pages for the flexibly sized virtual layer block in response to the total number of the virtual layer pointers that are stored in the flexibly sized virtual layer block exceeding a maximum number of virtual layer pointers that can be stored in a single page of the flexibly sized virtual layer block.

9. The method of claim 8, wherein the total size of the flexibly sized virtual layer block is not a page aligned value, and further comprising:

for each one of the multiple pages allocated for the flexibly sized virtual block, storing a separate checksum within that page, wherein the separate checksum is calculated for only the portion of the flexibly sized virtual layer block that is stored within that page.

10. A data storage system, comprising:

processing circuitry and memory coupled to the processing circuitry, the memory storing instructions, wherein the instructions, when executed by the processing circuitry, cause the processing circuitry to:

identify a working set of data blocks from a cache to flush to non-volatile data storage in the data storage system;

allocate a physical block of the non-volatile data storage;

compress a plurality of data blocks in the working set to generate compressed data blocks;

store the compressed data blocks into the physical block of non-volatile data storage until the physical block of non-volatile data storage is full;

for each one of the compressed data blocks stored into the physical block, store an independent virtual layer pointer indicating a location of that compressed data block within the physical block of non-volatile data storage into a single, flexibly sized virtual layer block that is allocated for the working set, wherein the flexibly sized virtual layer block is part of a logical address mapping tree;

dynamically calculate a total size of the flexibly sized virtual layer block, wherein the total size of the flexibly sized virtual layer block is calculated based on a total number of the virtual layer pointers that are stored in the flexibly sized virtual layer block, wherein the total size of the flexibly sized virtual layer block is calculated as an amount equal to a total number of pages allocated for the flexibly sized virtual layer block minus one, multiplied by a page size used by the data storage system, plus an amount of space that was used to store virtual layer pointers within a last page that was allocated for the flexibly size virtual layer block; and store the total size of the flexibly sized virtual layer block into the flexibly sized virtual layer block.

11. The data storage system of claim 10, wherein the logical address mapping tree maps logical addresses within a logical volume to locations of corresponding data in the non-volatile data storage.

12. The data storage system of claim 11, wherein the instructions, when executed by the processing circuitry, further cause the processing circuitry to bind the compressed data blocks stored in the physical block of non-volatile data storage to corresponding logical block addresses within the logical volume by storing leaf layer pointers within a leaf layer of the logical address mapping tree, wherein the leaf layer pointers point to the virtual layer pointers stored in the flexibly sized virtual layer block.

13. The data storage system of claim 12, wherein the compressed data blocks is stored into the physical block of non-volatile data storage at least in part by storing the compressed data blocks into the physical block of non-volatile data storage until the physical block of non-volatile data storage is full.

14. The data storage system of claim 13, wherein the total number of the virtual layer pointers that are stored in the flexibly sized virtual layer block is equal to a total number of the compressed data blocks stored into the physical block.

15. The data storage system of claim 14, wherein the instructions, when executed by the processing circuitry, further cause the processing circuitry to:
deduplicate the working set with regard to data blocks that were previously stored in the non-volatile data storage; and
wherein the plurality of data blocks in the working set that are compressed to generate the compressed data blocks are those of the data blocks in the working set that remain after the working set is deduplicated with regard to data blocks that were previously stored in the non-volatile data storage.

16. The data storage system of claim 15, wherein each virtual layer pointer comprises i) an offset of the compressed data block within the physical block of non-volatile data storage that is indicated by that virtual layer pointer, and ii) a size of the compressed data block within the physical block of non-volatile data storage that is indicated by that virtual layer pointer.

17. The data storage system of 16, wherein the total size of the flexibly sized virtual layer block is not a page aligned value, and wherein the instructions, when executed by the processing circuitry, further cause the processing circuitry to:
allocate multiple pages for the flexibly sized virtual layer block in response to the total number of the virtual layer pointers that are stored in the flexibly sized virtual layer block exceeding a maximum number of virtual layer pointers that can be stored in a single page of the flexibly sized virtual layer block; and
for each one of the multiple pages allocated for the flexibly sized virtual block, store a separate checksum within that page, wherein the separate checksum is calculated for only the portion of the flexibly sized virtual layer block that is stored within that page.

18. A computer program product, comprising:
a non-transitory, computer-readable medium having instructions stored thereon that, when executed by processing circuitry in a data storage system, cause the processing circuitry to perform a method comprising the steps of:
identifying a working set of data blocks from a cache to flush to non-volatile data storage in the data storage system;
allocating a physical block of the non-volatile data storage;
compressing a plurality of data blocks in the working set to generate compressed data blocks;
storing the compressed data blocks into the physical block of non-volatile data storage until the physical block of non-volatile data storage is full;
for each one of the compressed data blocks stored into the physical block, storing an independent virtual layer pointer indicating a location of that compressed data block within the physical block of non-volatile data storage into a single, flexibly sized virtual layer block that is allocated for the working set, wherein the flexibly sized virtual layer block is part of a logical address mapping tree;
dynamically calculating a total size of the flexibly sized virtual layer block, wherein the total size of the flexibly sized virtual layer block is calculated based on a total number of the virtual layer pointers that are stored in the flexibly sized virtual layer block, wherein the total size of the flexibly sized virtual layer block is calculated as an amount equal to a total number of pages allocated for the flexibly sized virtual layer block minus one, multiplied by a page size used by the data storage system, plus an amount of space that was used to store virtual layer pointers within a last page that was allocated for the flexibly size virtual layer block; and
storing the total size of the flexibly sized virtual layer block into the flexibly sized virtual layer block.

* * * * *